United States Patent
Mathis (10) Patent No.: US 10,472,592 B1
(45) Date of Patent: Nov. 12, 2019

(54) SYSTEMS AND METHODS FOR PURIFICATION OF FATS, OILS, AND GREASE FROM WASTEWATER

(71) Applicant: SMISSON-MATHIS ENERGY, LLC, Macon, GA (US)

(72) Inventor: Franklin Mathis, Dublin, GA (US)

(73) Assignee: Smisson-Mathis Energy, LLC, Macon, GA (US)

( * ) Notice: Subject to any disclaimer, the term of this patent is extended or adjusted under 35 U.S.C. 154(b) by 0 days.

(21) Appl. No.: 15/725,548

(22) Filed: Oct. 5, 2017

Related U.S. Application Data (60) Provisional application No. 62/404,897, filed on Oct. 6, 2016.

(51) Int. Cl.
| | | |
|---|---|---|
| C11B 13/00 | (2006.01) | |
| C10L 1/02 | (2006.01) | |
| C02F 1/38 | (2006.01) | |
| B01D 21/28 | (2006.01) | |
| B01D 21/26 | (2006.01) | |
| B01D 17/02 | (2006.01) | |

(Continued)

(52) U.S. Cl.
CPC .......... *C11B 13/00* (2013.01); *B01D 17/0217* (2013.01); *B01D 21/2494* (2013.01); *B01D 21/262* (2013.01); *B01D 21/283* (2013.01); *B01D 21/30* (2013.01); *C02F 1/385* (2013.01); *C10L 1/02* (2013.01); *C02F 2101/32* (2013.01); *C02F 2209/02* (2013.01); *C02F 2209/40* (2013.01); *C10L 2200/0476* (2013.01); *C10L 2200/0484* (2013.01)

(58) Field of Classification Search
None
See application file for complete search history.

(56) References Cited

U.S. PATENT DOCUMENTS 3,865,732 A * 2/1975 Terhune ............. G01N 33/1833
                                                210/315
4,507,208 A * 3/1985 Simon .................... B01D 36/00
                                                210/721

(Continued)

FOREIGN PATENT DOCUMENTS

| EP | 2479250 A1 | 7/2012 |
|---|---|---|
| WO | 2014202980 A2 | 12/2014 |

(Continued)

*Primary Examiner* — Richard C Gurtowski
(74) *Attorney, Agent, or Firm* — Eversheds Sutherland (US) LLP (57) ABSTRACT

Embodiments of the present disclosure provide a system for purifying fats, oils, and grease from wastewater. The system may include a trash pump configured to pump the wastewater into the system, a grinder pump positioned downstream of the trash pump and configured to grind materials in the wastewater to form a process mixture, a plurality of heat exchangers positioned downstream of the grinder pump and configured to heat the process mixture, a shaker tray positioned downstream of the grinder pump and configured to remove solids from the process mixture, a decanter positioned downstream of the shaker tray and configured to remove solids from the process mixture, and a centrifuge positioned downstream of the decanter and configured to remove liquids and solids from the process mixture to form purified FOG.

20 Claims, 3 Drawing Sheets

(51) Int. Cl.
  *B01D 21/30*   (2006.01)
  *B01D 21/24*   (2006.01)
  *C02F 101/32*   (2006.01)

(56) References Cited

U.S. PATENT DOCUMENTS

| | | | |
|---|---|---|---|
| 5,928,522 A * | 7/1999 | Conaway | B03B 9/02 |
| | | | 210/759 |
| 6,315,903 B1 * | 11/2001 | Noyes | B01D 17/005 |
| | | | 210/601 |
| 7,871,448 B2 | 1/2011 | Jackam et al. | |
| 8,545,702 B1 | 10/2013 | Shah et al. | |
| 8,580,119 B1 * | 11/2013 | Shah | C07C 67/03 |
| | | | 210/669 |
| 9,145,527 B2 | 9/2015 | Lu | |
| 2009/0014392 A1 * | 1/2009 | McEwen | B01D 17/0211 |
| | | | 210/744 |
| 2009/0031618 A1 | 2/2009 | Morgan | |
| 2010/0059453 A1 * | 3/2010 | Reardon | C02F 11/127 |
| | | | 210/727 |
| 2010/0312023 A1 | 12/2010 | Henkelmann et al. | |
| 2012/0110901 A1 * | 5/2012 | Olivier | A23J 1/006 |
| | | | 44/605 |
| 2012/0240452 A1 | 9/2012 | Erdoes, Jr. et al. | |

FOREIGN PATENT DOCUMENTS

| | | |
|---|---|---|
| WO | 2015031379 A1 | 3/2015 |
| WO | 2016089443 A1 | 6/2016 |

\* cited by examiner

SYSTEMS AND METHODS FOR PURIFICATION OF FATS, OILS, AND GREASE FROM WASTEWATER

CROSS-REFERENCE TO RELATED APPLICATIONS

This application claims priority to U.S. Provisional Patent Application Ser. No. 62/404,897 filed on Oct. 6, 2016, the entire contents of which are hereby incorporated by reference.

FIELD OF THE DISCLOSURE

The present disclosure relates generally to wastewater treatment and more particularly to systems and methods for purification of fats, oils, and grease from wastewater for subsequent use in biodiesel production.

BACKGROUND OF THE DISCLOSURE

A growing interest in biodiesel as a substitute for petroleum diesel has led researchers to explore the use of various renewable sources as a feedstock for biodiesel production. Of particular interest is the option of using fats, oils, and grease (FOG) present in wastewater as a feedstock alternative to virgin oil, waste vegetable oil, and other possible sources. In view of recent advances in economically converting FOG into biodiesel and the continuous supply of wastewater produced in modern society, the potential use of FOG extracted from wastewater for biodiesel production is highly desirable. However, past efforts in purifying FOG from wastewater have revealed significant problems in efficiently and effectively removing water and solid contaminants to produce FOG that is suitable for conversion into biodiesel. Additionally, the equipment and processing costs associated with FOG recovery from wastewater generally has been viewed as barrier to economically purifying FOG at wastewater treatment plants.

Accordingly, there remains a need for improved systems and methods for efficiently and effectively purifying FOG from wastewater at wastewater treatment plants to provide FOG that is suitable for biodiesel production.

SUMMARY OF THE DISCLOSURE

Various embodiments described herein provide systems and methods for purification of fats, oils, and grease from wastewater for subsequent use as a feedstock for biodiesel production. According to one aspect, a system for purifying fats, oils, and grease (FOG) from wastewater is provided. In one embodiment, the system may include a trash pump, a grinder pump, a plurality of heat exchangers, a shaker tray, a decanter, and a centrifuge. The trash pump may be configured to pump the wastewater into the system. The grinder pump may be positioned downstream of the trash pump and configured to grind materials in the wastewater to form a process mixture. The heat exchangers may be positioned downstream of the grinder pump and configured to heat the process mixture. The shaker tray may be positioned downstream of the grinder pump and configured to remove solids from the process mixture. The decanter may be positioned downstream of the shaker tray and configured to remove solids from the process mixture. The centrifuge positioned downstream of the decanter and configured to remove liquids and solids from the process mixture to form purified FOG.

In certain embodiments, the trash pump may be an auger style pump. In certain embodiments, the trash pump may be supported by one or more floats, such that the trash pump floats along a top of the wastewater contained within a wastewater reservoir. In certain embodiments, the grinder pump may be configured to grind the materials in the wastewater to a maximum dimension of 0.25 inch or less. In certain embodiments, the plurality of heat exchangers may include a first heat exchanger positioned downstream of the grinder pump and upstream of the shaker tray, a second heat exchanger positioned downstream of the shaker tray and upstream of the decanter, a third heat exchanger positioned downstream of the decanter and upstream of the centrifuge, and a fourth heat exchanger positioned downstream of the centrifuge. In certain embodiments, each of the heat exchangers may be configured to heat the process mixture to a temperature of between 185° F. and 200° F. In certain embodiments, the system also may include a hot fluid boiler configured to supply a heating fluid to each of the heat exchangers for heating the process mixture. In certain embodiments, the hot fluid boiler may be a hot oil boiler, and the heating fluid may be hot oil.

In certain embodiments, the shaker tray may be configured to remove solids having a maximum dimension greater than 0.035 inch from the process mixture. In certain embodiments, the decanter may be configured to remove solids from the process mixture such that the remaining process mixture contains less than 1% solids. In certain embodiments, the decanter may be a horizontal decanter. In certain embodiments, the centrifuge may be configured to remove liquids and solids from the process mixture to form the purified FOG containing less than 2% water and less than 0.1% solids. In certain embodiments, the centrifuge may be a vertical stack centrifuge. In certain embodiments, the system also may include an auger in fluid communication with each of the shaker tray, the decanter, and the centrifuge, and the auger may be configured to deliver the removed solids and liquids to a waste reservoir. In certain embodiments, the system also may include a vent in fluid communication with each of the shaker tray, the decanter, and the centrifuge, and the vent may be configured to controllably release gases produced during operation of the shaker tray, the decanter, and the centrifuge.

In certain embodiments, the system also may include a controller operable to monitor a plurality of operating parameters of the system, and the controller may be in operable communication with a plurality of sensors configured to indicate the operating parameters. In certain embodiments, the plurality of sensors may include a plurality of temperature sensors configured to indicate the temperature of the process mixture at a plurality of points along the system, and a plurality of flow rate sensors configured to indicate the flow rate of the process mixture at a plurality of points along the system. In certain embodiments, the controller may be in operable communication with each of the pumps, the heat exchangers, the shaker tray, the decanter, and the centrifuge, and the controller may be operable to control operation of the pumps, the heat exchangers, the shaker tray, the decanter, and the centrifuge based at least in part on the operating parameters monitored by the controller. In certain embodiments, the system also may include a memory in operable communication with the controller and configured to store data corresponding to the operating parameters monitored and controlled by the controller. In certain embodiments, the controller may be operable to compare current operating parameters to the data stored by the memory and to selectively adjust one or more of the operating parameters to optimize a composition of the purified FOG.

According to another aspect, a method for purifying fats, oils, and grease (FOG) from wastewater is provided. In one embodiment, the method may include: pumping the wastewater into a system via a trash pump; grinding materials in the wastewater via a grinder pump to form a process mixture; heating the process mixture via a first heat exchanger; removing solids from the process mixture via a shaker tray; reheating the process mixture via a second heat exchanger; removing solids from the process mixture via a decanter; reheating the process mixture via a third heat exchanger; and removing liquids and solids from the process mixture via a centrifuge to form purified FOG.

In certain embodiments, the trash pump may be an auger style pump. In certain embodiments, the method also may include allowing the trash pump to float along a top of the wastewater contained within a wastewater reservoir. In certain embodiments, grinding the materials in the wastewater via the grinder pump may include grinding the materials in the wastewater to a maximum dimension of 0.25 inch or less. In certain embodiments, the first heat exchanger may heat the process mixture to a temperature of between 185° F. and 200° F., and the second heat exchanger and the third heat exchanger each may reheat the process mixture to a temperature of between 185° F. and 200° F. In certain embodiments, the method also may include reheating the purified FOG via a fourth heat exchanger. In certain embodiments, removing the solids from the process mixture via the shaker tray may include removing solids having a maximum dimension greater than 0.035 inch from the process mixture. In certain embodiments, the decanter may be a horizontal decanter. In certain embodiments, removing the solids from the process mixture via the decanter may include removing the solids from the process mixture such that the remaining process mixture contains less than 1% solids. In certain embodiments, the centrifuge may be a vertical stack centrifuge. In certain embodiments, removing the liquids and the solids from the process mixture via the centrifuge to form purified FOG may include removing the liquids and the solids from the process mixture to form the purified FOG containing less than 2% water and less than 0.1% solids. In certain embodiments, the method also may include delivering the solids and liquids removed by the shaker tray, the decanter, and the centrifuge to a waste reservoir via an auger. In certain embodiments, the method also may include controllably releasing gases produced during operation of the shaker tray, the decanter, and the centrifuge via a vent.

In certain embodiments, the method also may include monitoring a plurality of operating parameters of the system via a controller in operable communication with a plurality of sensors configured to indicate the operating parameters. In certain embodiments, monitoring the operating parameters of the system may include monitoring the temperature of the process mixture at a plurality of points along the system, and monitoring the flow rate of the process mixture at a plurality of points along the system. In certain embodiments, the method also may include controlling, via the controller, operation of the pumps, the heat exchangers, the shaker tray, the decanter, and the centrifuge based at least in part on the operating parameters monitored by the controller. In certain embodiments, the method also may include storing, via a memory, data corresponding to the operating parameters monitored and controlled by the controller. In certain embodiments, the method also may include comparing, via the controller, current operating parameters to the data stored by the memory and selectively adjusting one or more of the operating parameters to optimize a composition of the purified FOG.

These and other aspects and embodiments of the present disclosure will be apparent or will become apparent to one of ordinary skill in the art upon review of the following detailed description when taken in conjunction with the several drawings and the appended claims.

BRIEF DESCRIPTION OF THE DRAWINGS

In describing the various embodiments of the present disclosure, reference is made to the accompanying drawings, which are not necessarily drawn to scale, and wherein.

DETAILED DESCRIPTION OF THE DISCLOSURE

Various embodiments of the present disclosure provide improved systems and methods for purification of fats, oils, and grease (FOG) from wastewater for subsequent use as a feedstock for biodiesel production. Such systems and methods may address one or more of the above-described problems experienced with existing technology for FOG recovery from wastewater at wastewater treatment plants.

Embodiments of the present disclosure are described herein below with reference to the accompanying drawings, in which some, but not all, embodiments are shown. Indeed, the systems and methods disclosed may be embodied in many different forms and should not be construed as limited to the embodiments set forth herein; rather, these embodiments are provided so that this disclosure is thorough and complete and fully conveys the scope of the systems and methods to those skilled in the art. Like reference numbers refer to like elements throughout. The singular forms "a," "an," and "the" can refer to plural instances unless the context clearly dictates otherwise or unless explicitly stated.

Figure 1A:
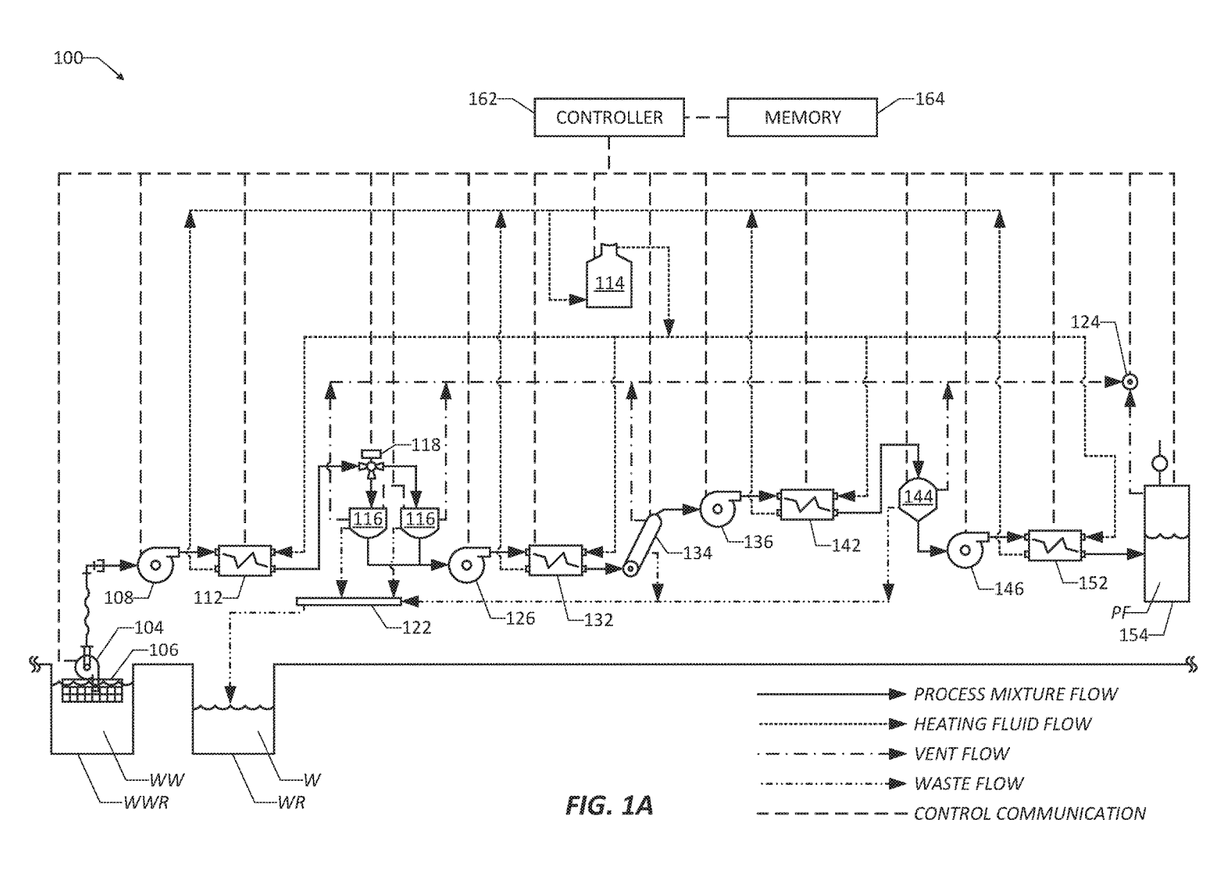
FIG. 1A is a schematic diagram of a system for purification of fats, oils, and grease from wastewater.
Figure 1B:
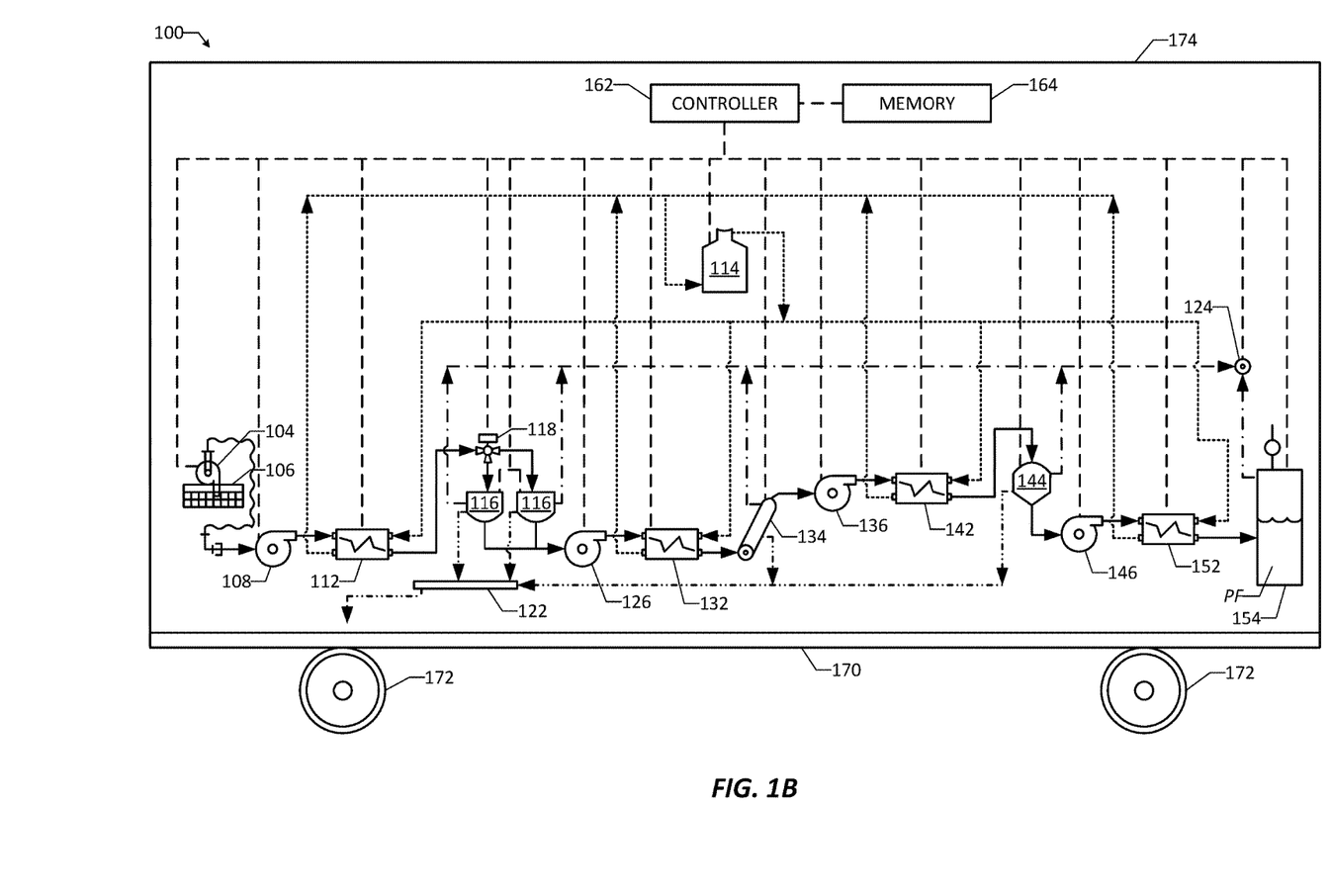
FIG. 1B is a schematic diagram of system for purification of fats, oils, and grease from wastewater, including a mobile platform for transporting the system.

Referring now to the drawings, FIGS. 1A and 1B illustrate a FOG purification system 100 (which also may be referred to as a "FOG harvester" or simply a "system") according to one or more embodiments of the disclosure. As described in detail below, the FOG purification system 100 may be used at a wastewater treatment plant to extract fats, oils, and grease (FOG) from wastewater. In contrast to existing technology, the FOG purification system 100 advantageously may provide an efficient and effective means for removing water and solid contaminants to produce FOG that is suitable for use as a feedstock for biodiesel production. In this manner, use of the FOG purification system 100 may take advantage of the continuous supply of wastewater, remove FOG that otherwise would be disposed of as environmental waste, and allow the purified FOG to be put to valuable use. In certain embodiments, the FOG purification system 100 may be provided as a mobile system, such that the system 100 may be transported to and operated at a wastewater treatment plant when desired and then removed. In other embodiments, the FOG purification system 100 may be provided as a fixed system, such that the system 100 is installed at a wastewater treatment plant and operated continuously or at regular intervals.

The FOG purification system 100 may include a number of components arranged and configured such that wastewater WW input into the system 100 is separated into purified FOG PF and waste W consisting of water and solid materials removed from the wastewater WW. In certain embodiments, the purified FOG PF produced by the system 100 may be at least 98% free of water and at least 99.9% free of solids. In other words, the purified FOG PF may contain less than 2% water and less than 0.01% solids. In this manner, the purified FOG PF may be suitable for use as a feedstock for the production of biodiesel. The schematic illustration of the FOG purification system 100 in FIGS. 1A and 1B shows various flows between the components of the system 100. It will be appreciated that the components may be in fluid communication with one another via suitable lines, pipes, or tubes, such that the various flows are directed from one component to another component as shown. As used herein, the term "process mixture" refers to the mixture of materials passing through the FOG purification system 100 as the wastewater WW is separated into purified FOG PF and waste W. It will be appreciated that the composition of the process mixture changes as the components of the system 100 remove water and solid materials to produce purified FOG PF.

As shown, the FOG purification system 100 may include a trash pump 104 configured to pump the wastewater WW into the system 100. In certain embodiments, the trash pump 104 may be an auger style pump, although other types of pumps may be used for the trash pump 104. As shown, the trash pump 104 may be supported by one or more floats 106, such as pontoons. In this manner, the trash pump 104 may float along the top of the wastewater WW contained within a wastewater reservoir WWR at a wastewater treatment plant, with the inlet of the trash pump 104 submerged in the wastewater WW. It will be appreciated that the wastewater WW may include liquids (e.g., water), semi-liquids (e.g., FOG), and various solids (e.g., trash and other debris) that may make its way into the wastewater reservoir WWR. The trash pump 104 may be specifically configured to pump semi-solids, such as FOG, yet capable of pumping any solids that enter the inlet of the trash pump 104. In operation, the trash pump 104, generally may receive liquid and floating solids (i.e., solids having a specific gravity less than the liquid), while heavier solids settle at the bottom of the wastewater reservoir WWR. Ultimately, the trash pump 104 pumps the wastewater WW out of the wastewater reservoir WWR and to a grinder pump 108 of the system 100.

The grinder pump 108 may be configured to grind all of the materials in the wastewater WW and to pump the resulting process mixture downstream for further processing. In particular, the grinder pump 108 may be configured to grind all of the solid materials that the trash pump 104 is able to deliver to the grinder pump 108. In certain embodiments, the grinder pump 108 may be configured to grind all materials in the wastewater WW to a maximum dimension of 0.25 inch or less. In this manner, the resulting process mixture leaving the grinder pump 108 may flow more easily through downstream components of the system 100. In certain embodiments, the grinder pump 108 may pump the process mixture at a flow rate of between 20 gallons per minute and 40 gallons per minute, between 25 gallons per minute and 35 gallons per minute, or about 30 gallons per minute. As shown, the grinder pump 108 may pump the process mixture to a first heat exchanger 112 of the system 100.

The first heat exchanger 112, which may be a large bore heat exchanger, may be configured to heat the process mixture such that the process mixture may flow more easily through downstream components of the system 100. In particular, the heating of the process mixture may inhibit buildup or clogging of semi-liquids, such as FOG, within the system 100. In certain embodiments, the first heat exchanger 112 may heat the process mixture to a temperature of between 185° F. and 200° F., or about 185° F. As shown, the first heat exchanger 112 may be in fluid communication with a hot fluid boiler 114 which may supply a continuous flow of a heating fluid for heating the process mixture within the first heat exchanger 112. In certain embodiments, the hot fluid boiler 114 may be a hot oil boiler and the heating fluid may be hot oil. In certain embodiments, the heating fluid may be supplied to the first heat exchanger 112 at a temperature of between 240° F. and 260° F., or about 250° F. In other embodiments, the heating fluid may be supplied to the first heat exchanger 112 at other temperatures sufficient to adequately heat the process mixture. As shown, after exiting the first heat exchanger 112, the cooled heating fluid may be returned to the hot fluid boiler 114 for reheating and reuse within the system 100. The heated process mixture (at a temperature of between 185° F. and 200° F.) may be delivered from the first heat exchanger 112 to one or more shaker trays 116.

The shaker trays 116 may be configured to remove any material having a maximum dimension greater than 0.035 inch from the process mixture. Although the illustrated embodiment of the FOG purification system 100 includes two shaker trays 116, the system 100 may include any number of shaker trays 116 (one, three, or more). In embodiments of the system 100 which include more than one shaker tray 116, a valve 118 may be positioned between the first heat exchanger 112 and the shaker trays 116, as shown, to control delivery of the process mixture to the shaker trays 116. For example, the valve 118 may be a three-way valve for controlling delivery of the process mixture to the two shaker trays 116. In certain embodiments, only one of the shaker trays 116 may be operated at a time, such that the valve 118 directs the process mixture to one of the shaker trays 116, while the other shaker tray 116 may be turned off. In other embodiments, both of the shaker trays 116 may be operated simultaneously. As shown, the shaker trays 116 may be in fluid communication with a vent 122 of the system 100 via one or more lines, pipes, or tubes. In this manner, gases produced during operation of the shaker trays 116 may be collected and directed to the vent 122 for controlled release from the system 100. As shown, the material removed by the shaker trays 116 (i.e., material having a maximum dimension greater than 0.035 inch) may be directed to an auger 124, which may deliver the waste W to a waste reservoir WR of the wastewater treatment plant for landfill collection and/or further treatment. The remaining process mixture, consisting of liquids, semi-liquids, and small solids, may be directed from the shaker trays 116 to a centrifugal pump 126.

The centrifugal pump 126 may be configured to pump the remaining process mixture to a second heat exchanger 132 of the system 100. The second heat exchanger 132, which may be a large bore heat exchanger, may be configured to reheat the process mixture such that the process mixture may continue to flow more easily through downstream components of the system 100. In certain embodiments, the second heat exchanger 132 may heat the process mixture to a temperature of between 185° F. and 200° F., or about 200° F. As shown, the second heat exchanger 132 may be in fluid communication with the hot fluid boiler 114 which may supply a continuous flow of the heating fluid for heating the process mixture within the second heat exchanger 132. In certain embodiments, the heating fluid may be supplied to the second heat exchanger 132 at a temperature of between 240° F. and 260° F., or about 250° F. In other embodiments, the heating fluid may be supplied to the second heat exchanger 132 at other temperatures sufficient to adequately heat the process mixture to inhibit buildup or clogging of semi-liquids, such as FOG. As shown, after exiting the second heat exchanger 132, the cooled heating fluid may be returned to the hot fluid boiler 114 for reheating and reuse within the system 100. The reheated process mixture (at a temperature of between 185° F. and 200° F.) may be delivered from the second heat exchanger 132 to a decanter 134.

The decanter 134 may be configured to remove substantially all of the remaining solids from the process mixture. In certain embodiments, the decanter 134 may be a horizontal decanter, as shown. In certain embodiments, the decanter 134 may be configured to remove at least 99% of all solids from the process mixture. In other words, the process mixture output by the decanter 134 may contain less than 1% solids. As shown, the decanter 134 may be in fluid communication with the vent 122 via one or more lines, pipes, or tubes. In this manner, gases produced during operation of the decanter 134 may be collected and directed to the vent 122 for controlled release from the system 100. As shown, the material removed by the decanter 134 (i.e., a majority of the solids) may be directed to the auger 124, which may deliver the waste W to the waste reservoir WR for landfill collection and/or further treatment. The remaining process mixture, consisting of liquids, semi-liquids, and limited amount of solids, may be directed from the decanter 134 to a mechanical pump 136.

The mechanical pump 136 may be configured to pump the remaining process mixture to a third heat exchanger 142 of the system 100. The third heat exchanger 142, which may be a large bore heat exchanger, may be configured to reheat the process mixture such that the process mixture may continue to flow more easily through downstream components of the system 100. In certain embodiments, the third heat exchanger 142 may heat the process mixture to a temperature of between 185° F. and 200° F., or about 200° F. As shown, the third heat exchanger 142 may be in fluid communication with the hot fluid boiler 114 which may supply a continuous flow of the heating fluid for heating the process mixture within the third heat exchanger 142. In certain embodiments, the heating fluid may be supplied to the third heat exchanger 142 at a temperature of between 240° F. and 260° F., or about 250° F. In other embodiments, the heating fluid may be supplied to the third heat exchanger 142 at other temperatures sufficient to adequately heat the process mixture to inhibit buildup or clogging of semi-liquids, such as FOG. As shown, after exiting the third heat exchanger 142, the cooled heating fluid may be returned to the hot fluid boiler 114 for reheating and reuse within the system 100. The reheated process mixture (at a temperature of between 185° F. and 200° F.) may be delivered from the third heat exchanger 142 to a centrifuge 144.

The centrifuge 144 may be configured to remove substantially all of the remaining liquids and solids from the process mixture. In certain embodiments, the centrifuge 144 may be a vertical stack centrifuge, as shown. In certain embodiments, the centrifuge 144 may be configured to remove at least 98% of all water and at least 99.9% of all solids from the process mixture. In other words, the process mixture output by the centrifuge 144 may contain less than 2% water and less than 0.1% solids. As shown, the centrifuge 144 may be in fluid communication with the vent 122 via one or more lines, pipes, or tubes. In this manner, gases produced during operation of the centrifuge 144 may be collected and directed to the vent 122 for controlled release from the system 100. As shown, the material removed by the centrifuge 144 (i.e., a majority of the water and the solids) may be directed to the auger 124, which may deliver the waste W to the waste reservoir WR for landfill collection and/or further treatment. The remaining process mixture, consisting of primarily of semi-liquids and very limited amounts of liquids and solids, may be directed from the centrifuge 144 to a mechanical pump 146. In other words, the remaining process mixture may be purified FOG PF which is at least 98% free of water and at least 99.9% free of solids.

The mechanical pump 146 may be configured to pump the purified FOG PF to a fourth heat exchanger 152 of the system 100. The fourth heat exchanger 152, which may be a large bore heat exchanger, may be configured to reheat the purified FOG PF such that the purified FOG PF may continue to flow more easily to downstream components of the system 100. In certain embodiments, the fourth heat exchanger 152 may heat the purified FOG PF to a temperature of between 185° F. and 200° F., or about 200° F. As shown, the fourth heat exchanger 152 may be in fluid communication with the hot fluid boiler 114 which may supply a continuous flow of the heating fluid for heating the purified FOG PF within the fourth heat exchanger 152. In certain embodiments, the heating fluid may be supplied to the fourth heat exchanger 152 at a temperature of between 240° F. and 260° F., or about 250° F. In other embodiments, the heating fluid may be supplied to the fourth heat exchanger 152 at other temperatures sufficient to adequately heat the purified FOG PF to inhibit buildup or clogging thereof. As shown, after exiting the fourth heat exchanger 152, the cooled heating fluid may be returned to the hot fluid boiler 114 for reheating and reuse within the system 100. The purified FOG PF (at a temperature of between 185° F. and 200° F.) may be delivered from the fourth heat exchanger 152 to a storage vessel 154. As shown, the storage vessel 154 may be in fluid communication with the vent 122 via one or more lines, pipes, or tubes. In this manner, gases produced as the purified FOG PF settles in the storage vessel 154 may be collected and directed to the vent 122 for controlled release from the system 100. In certain embodiments, the storage vessel 154 may have a caustic scrubber, such as sodium hydroxide, therein to control odors produced by the purified FOG PF. The purified FOG PF collected in the storage vessel 154 ultimately may be used as a feedstock for biodiesel production.

As shown, the FOG purification system 100 may include a controller 162, which may be a programmable logic controller (PLC). The controller 162 may be operable to monitor various operating parameters of the system 100 and to control operation of the above-described components of the system 100. In certain embodiments, the controller 162 may be in operable communication with sensors positioned along the various lines, pipes, or tubes extending between the system 100 components. The sensors may include temperature sensors configured to indicate the temperature of the process mixture at certain points along the system 100, for example, immediately upstream and downstream of each of the heat exchangers 112, 132, 142, 152. Additional temperature sensors may be used to indicate the temperature of the heating fluid at certain points along the system 100, for example, immediately upstream and downstream of each of the heat exchangers 112, 132, 142, 152 and immediately upstream and downstream of the hot fluid boiler 114. The sensors also may include flow rate sensors configured to indicate the flow rate of the process mixture at certain points along the system 100, for example, immediately upstream and downstream of each of the pumps 104, 108, 126, 136, 146, immediately upstream and downstream of each of the heat exchangers 112, 132, 142, 152, and/or immediately upstream and downstream of each of the shaker trays 116, the decanter 134, and the centrifuge 144. Additional flow rate sensors may be used to indicate the flow rate of the heating fluid at certain points along the system 100, for example, immediately upstream and downstream of each of the heat exchangers 112, 132, 142, 152 and immediately upstream and downstream of the hot fluid boiler 114. The sensors further may include a volumetric sensor positioned on or within the storage vessel 154 and configured to indicate the volume of the purified FOG PF contained therein. The sensors may include still other types of sensors to allow the controller 162 to monitor other operating parameters of the system 100.

The controller 162 also may be operable to control operation of the above-described components of the system 100. As shown, the controller 162 may be in operable communication with each of the pumps 104, 108, 126, 136, 146, the heat exchangers 112, 132, 142, 152, the shaker trays 116, the valve 118, the vent 124, the decanter 134, the centrifuge 144, and the storage vessel 154. In certain embodiments, the controller 162 may be operable to control (i.e., increase, decrease, or maintain) the speeds of the pumps 104, 108, 126, 136, 146, thereby controlling the flow rate of the process mixture being output by each of the pumps 104, 108, 126, 136, 146. For example, the controller 162 may be operable to control the speeds of the pumps 104, 108, 126, 136, 146 based at least in part on the flow rates indicated by the flow rate sensors and/or the temperatures indicated by the temperature sensors. In certain embodiments, the controller 162 also may be operable to control the temperature of the heating fluid being delivered to the heat exchangers 112, 132, 142, 152, thereby controlling the temperature of the process mixture being output by each of the heat exchangers 112, 132, 142, 152. For example, the controller 162 may be operable to control the temperature of the heating fluid being delivered to the heat exchangers 112, 132, 142, 152 based at least in part on the flow rates indicated by the flow rate sensors and/or the temperatures indicated by the temperature sensors. In certain embodiments, the controller 162 further may be operable to control the speeds of the shaker trays 116, the decanter 134, and the centrifuge 144, thereby controlling the rates at which the shaker trays 116 and the decanter 134 remove solids from the process mixture and at which the centrifuge 144 removes liquids and solids from the process mixture. For example, the controller 162 may be operable to control the speeds of the shaker trays 116, the decanter 134, and the centrifuge 144 based at least in part on the flow rates indicated by the flow rate sensors and/or the temperatures indicated by the temperature sensors.

As shown, the FOG purification system 100 also may include a memory 164 in operable communication with the controller 162. The memory 164 may be configured to store data corresponding to the various operating parameters that are monitored and controlled by the controller 162 (i.e., temperatures, flow rates, volumes, and speeds). In certain embodiments, the controller 162 may compare current (i.e., real-time) operating parameters to the data stored in the memory 164 and selectively adjust one or more of the operating parameters to optimize the FOG purification process (i.e., to optimize the composition of the purified FOG PF). In this manner, the controller 162 may ensure that the FOG purification system 100 operates in an efficient and effective manner to extract the FOG from the wastewater.

In certain embodiments, the above-described components of the FOG purification system 100 may be mounted on a platform or a skid 170, as shown in FIG. 1B. In this manner, the entire system 100 may be easily transported, for example via a tractor-trailer, to a wastewater treatment plant for operation. The platform 170 may be positioned near the wastewater reservoir WWR, and the trash pump 104 and float 106 may be moved into the reservoir WWR, while the remainder of the system 100 remains fixedly mounted to the platform 170. In some embodiments, the mobile platform 170 may be a trailer, container, or other suitable structure for supporting and moving the other components of the system 100 as a unit from one location to another location. Although the platform 170 is shown as including a plurality of wheels 172, the platform 170 may include alternative mechanisms for moving the system 100 to different locations. In some embodiments, the platform 170 may include an enclosure 174 containing the other components of the system 100 therein. In other embodiments, the FOG purification system 100 may be permanently installed at the wastewater treatment plant near the wastewater reservoir WWR.

Figure 2:
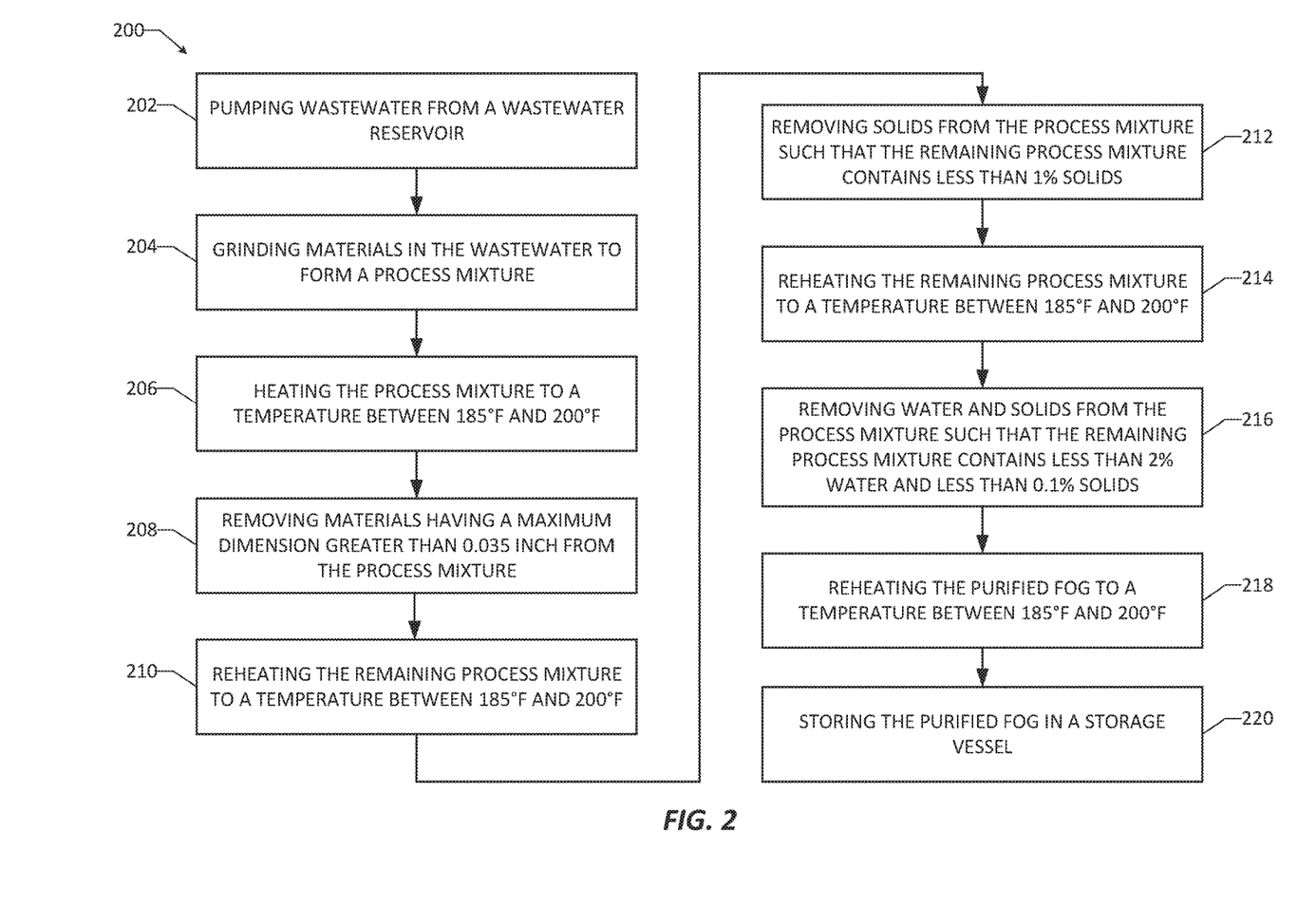
FIG. 2 is a flow chart of a method for purification of fats, oils, and grease from wastewater.

FIG. 2 illustrates a method 200 for purifying fats, oils, and grease (FOG) from wastewater, according to one or more embodiments of the disclosure. The method 200 may include, at step 202, pumping wastewater from a wastewater reservoir. In certain embodiments, the wastewater may be pumped from the wastewater reservoir via a trash pump, such as an auger style trash pump. At step 204, the method 200 may include grinding the materials in the wastewater to form a process mixture. In certain embodiments, the materials in the wastewater may be ground via grinder pump to a maximum dimension of 0.25 inch or less. The method 200 also may include, at step 206, heating the process mixture to a temperature of between 185° F. and 200° F., or about 185° F. In certain embodiments, the process mixture may be heated via a heat exchanger, such as a large bore heat exchanger.

At step 208, the method 200 may include removing materials having a maximum dimension greater than 0.035 inch from the process mixture. In certain embodiments, such removal may be achieved via a shaker tray. The method 200 also may include, at step 210, reheating the remaining process mixture to a temperature of between 185° F. and 200° F., or about 200° F. In certain embodiments, the remaining process mixture may be reheated via a heat exchanger, such as a large bore heat exchanger. At step 212, the method 200 may include removing substantially all of the remaining solids from the process mixture such that the remaining process mixture contains less than 1% solids. In certain embodiments, such removal may be achieved via a decanter, such as a horizontal decanter. The method 200 also may include, at step 214, reheating the remaining process mixture to a temperature of between 185° F. and 200° F., or about 200° F. In certain embodiments, the remaining process mixture may be reheated via a heat exchanger, such as a large bore heat exchanger.

At step 216, the method 200 may include removing substantially all of the remaining liquids and solids from the process mixture such that the remaining process mixture contains less than 2% water and less than 0.1% solids, thereby forming purified FOG. In certain embodiments, such removal may be achieved via a centrifuge, such as a vertical stack centrifuge. The method 200 also may include, at step 218, reheating the purified FOG to a temperature of between 185° F. and 200° F., or about 200° F. In certain embodiments, the purified FOG may be reheated via a heat exchanger, such as a large bore heat exchanger. At step 220, the method may include storing the purified FOG in a storage vessel for subsequent use as a feedstock for biodiesel product.

The purified FOG prepared by the method 200 may be used as a feedstock for biodiesel production according to various processes. As one example, the purified FOG may be used as a feedstock for the production of alkyl esters, such as biodiesel according to the methods described in International Application No. PCT/US2015/031570 (International Publication No. WO 2016/089443), the entire contents of which are hereby incorporated by reference. According to such methods, at least one enzyme and alcohol may be added to the purified FOG to elicit an enzyme catalyzed reaction with the purified FOG, thereby forming reacted contents which are used in a double distillation process to produce biodiesel.

Many modifications of the embodiments of the present disclosure will come to mind to one skilled in the art to which the disclosure pertains upon having the benefit of the teachings presented herein through the foregoing descriptions and the associated drawings. Therefore, it is to be understood that the present invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for purifying fats, oils, and grease (FOG) from wastewater, the system comprising:
    a trash pump configured to pump the wastewater into the system;
    a grinder pump positioned downstream of the trash pump and configured to grind materials in the wastewater to form a process mixture;
    a first heat exchanger positioned downstream of the grinder pump and configured to heat the process mixture;
    a shaker tray positioned downstream of the first heat exchanger and configured to remove solids from the process mixture;
    a second heat exchanger positioned downstream of the shaker tray and configured to reheat the process mixture;
    a decanter positioned downstream of the second heat exchanger and configured to remove solids from the process mixture; and
    a centrifuge positioned downstream of the decanter and configured to remove liquids and solids from the process mixture to form purified FOG.

2. The system of claim 1, wherein the trash pump is supported by one or more floats, such that the trash pump floats along a top of the wastewater contained within a wastewater reservoir.

3. The system of claim 1, wherein the grinder pump is configured to grind the materials in the wastewater to a maximum dimension of 0.25 inch or less, wherein the shaker tray is configured to remove solids having a maximum dimension greater than 0.035 inch from the process mixture, wherein the decanter is configured to remove solids from the process mixture such that the remaining process mixture contains less than 1% solids, and wherein the centrifuge is configured to remove liquids and solids from the process mixture to form the purified FOG containing less than 2% water and less than 0.1% solids.

4. The system of claim 1, wherein the trash pump is an auger style pump, wherein the decanter comprises a horizontal decanter, and wherein the centrifuge comprises a vertical stack centrifuge.

5. The system of claim 1, further comprising:
    a third heat exchanger positioned downstream of the decanter and upstream of the centrifuge and configured to reheat the process mixture; and
    a fourth heat exchanger positioned downstream of the centrifuge and configured to heat the purified FOG.

6. The system of claim 1, further comprising a hot fluid boiler configured to supply a heating fluid to each of the heat exchangers for heating the process mixture.

7. The system of claim 5, wherein the first heat exchanger is configured to heat the process mixture to a temperature of between 185° F. and 200° F., wherein the second heat exchanger is configured to reheat the process mixture to a temperature of between 185° F. and 200° F., wherein the third heat exchanger is configured to reheat the process mixture to a temperature of between 185° F. and 200° F., and wherein the fourth heat exchanger is configured to heat the purified FOG to a temperature of between 185° F. and 200° F.

8. The system of claim 1, further comprising an auger in fluid communication with each of the shaker tray, the decanter, and the centrifuge, wherein the auger is configured to deliver the removed solids and liquids to a waste reservoir.

9. The system of claim 1, further comprising a vent in fluid communication with each of the shaker tray, the decanter, and the centrifuge, wherein the vent is configured to controllably release gases produced during operation of the shaker tray, the decanter, and the centrifuge.

10. The system of claim 1, further comprising a controller operable to monitor a plurality of operating parameters of the system, wherein the controller is in operable communication with a plurality of sensors configured to indicate the operating parameters, and wherein the plurality of sensors comprises a plurality of temperature sensors configured to indicate the temperature of the process mixture at a plurality of points along the system, and a plurality of flow rate sensors configured to indicate the flow rate of the process mixture at a plurality of points along the system.

11. The system of claim 10, wherein the controller is in operable communication with each of the pumps, the heat exchangers, the shaker tray, the decanter, and the centrifuge, and wherein the controller is operable to control operation of the pumps, the heat exchangers, the shaker tray, the decanter, and the centrifuge based at least in part on the operating parameters monitored by the controller.

12. The system of claim 11, further comprising a memory in operable communication with the controller and configured to store data corresponding to the operating parameters monitored and controlled by the controller, wherein the controller is operable to compare current operating parameters to the data stored by the memory and to selectively adjust one or more of the operating parameters to optimize a composition of the purified FOG.

13. A system for purifying fats, oils, and grease (FOG) from wastewater, the system comprising:
    a trash pump configured to pump the wastewater into the system;

a grinder pump positioned downstream of the trash pump and configured to grind materials in the wastewater to a maximum dimension of 0.25 inch or less to form a process mixture;

a first heat exchanger positioned downstream of the grinder pump and configured to heat the process mixture to a temperature of between 185° F. and 200° F.;

a shaker tray positioned downstream of the first heat exchanger and configured to remove solids having a maximum dimension greater than 0.035 inch from the process mixture;

a second heat exchanger positioned downstream of the shaker tray and configured to reheat the process mixture to a temperature of between 185° F. and 200° F.;

a decanter positioned downstream of the second heat exchanger and configured to remove solids from the process mixture such that the remaining process mixture contains less than 1% solids;

a third heat exchanger positioned downstream of the decanter and configured to reheat the process mixture to a temperature of between 185° F. and 200° F.;

a centrifuge positioned downstream of the third heat exchanger and configured to remove liquids and solids from the process mixture to form purified FOG containing less than 2% water and less than 0.1% solids;

a fourth heat exchanger positioned downstream of the centrifuge and configured to heat the purified FOG to a temperature of between 185° F. and 200° F.; and a storage vessel positioned downstream of the fourth heat exchanger and configured to collect the purified FOG therein.

14. A method of using the system of claim 1, the method comprising:

pumping wastewater into the system via the trash pump;

grinding materials in the wastewater via the grinder pump to form the process mixture;

heating the process mixture via the first heat exchanger;

removing solids from the process mixture via the shaker tray;

reheating the process mixture via the second heat exchanger;

removing solids from the process mixture via the decanter; and removing liquids and solids from the process mixture via the centrifuge to form purified FOG.

15. The method of claim 14, the method further comprising:

reheating the process mixture via a third heat exchanger positioned downstream of the decanter and upstream of the centrifuge; and heating the purified FOG via a fourth heat exchanger positioned downstream of the centrifuge.

16. The method of claim 14, wherein grinding the materials in the wastewater via the grinder pump comprises grinding the materials in the wastewater to a maximum dimension of 0.25 inch or less, wherein removing the solids from the process mixture via the shaker tray comprises removing solids having a maximum dimension greater than 0.035 inch from the process mixture, wherein removing the solids from the process mixture via the decanter comprises removing the solids from the process mixture such that the remaining process mixture contains less than 1% solids, and wherein removing the liquids and the solids from the process mixture via the centrifuge to form purified FOG comprises removing the liquids and the solids from the process mixture to form the purified FOG containing less than 2% water and less than 0.1% solids.

17. The method of claim 14, wherein the trash pump is an auger style pump, wherein the decanter comprises a horizontal decanter, and wherein the centrifuge comprises a vertical stack centrifuge.

18. The method of claim 15, wherein the first heat exchanger heats the process mixture to a temperature of between 185° F. and 200° F., and wherein the second heat exchanger and the third heat exchanger each reheat the process mixture to a temperature of between 185° F. and 200° F.

19. The method of claim 14, further comprising monitoring a plurality of operating parameters of the system via a controller in operable communication with a plurality of sensors configured to indicate the operating parameters, wherein monitoring the operating parameters of the system comprises monitoring the temperature of the process mixture at a plurality of points along the system, and monitoring the flow rate of the process mixture at a plurality of points along the system.

20. The method of claim 19, further comprising:

controlling, via the controller, operation of the pumps, the heat exchangers, the shaker tray, the decanter, and the centrifuge based at least in part on the operating parameters monitored by the controller;

storing, via a memory, data corresponding to the operating parameters monitored and controlled by the controller; and comparing, via the controller, current operating parameters to the data stored by the memory and selectively adjusting one or more of the operating parameters to optimize a composition of the purified FOG.

* * * * *